UNITED STATES PATENT OFFICE.

LOUIS PRANG, OF BOSTON, MASSACHUSETTS.

IMPROVEMENT IN THE MANUFACTURE OF CAUSTIC ALKALI.

Specification forming part of Letters Patent No. 55,158, dated May 29, 1866.

*To all whom it may concern:*

Be it known that I, LOUIS PRANG, of Boston, in the county of Suffolk and State of Massachusetts, have invented a new and useful Caustic Alkaline Powder; and I do hereby declare the following to be a full and exact description thereof.

The nature of my invention consists in producing a caustic alkaline powder by a union of the same elements and by the same chemical reactions as those by which the crystalline hydrates of soda or potash are now made.

To enable others skilled in the art to make and use my invention, I will proceed to describe the mode of its manufacture.

I take quicklime and carbonate of soda or potash in the proper proportions to obtain by their combination a caustic alkali. I then dissolve the carbonate of soda or potash in just enough and no more water than is necessary to slake or reduce the quicklime to a dry powder, which solution is then poured over the quicklime, causing it to slake, care being taken that no more of the liquid be poured upon the lime than is necessary to reduce it to the condition of powder. The chemical reactions will, of course, be the same as in the ordinary process of manufacturing caustic potash or soda, though the caustic alkali will remain combined in a sort of semi-mechanical manner with the resulting carbonate of lime, which is in reality the powder that forms the medium of rendering the caustic alkali portable, and removes the chances of accidents which might occur from unskillful handling.

What I claim as my invention, and desire to secure by Letters Patent, is—

The mode herein described of combining any alkali with lime in such a way as to obtain a powder to serve when dissolved as caustic lye.

LOUIS PRANG.

Witnesses:
DENNIS COBB,
THOMAS F. CURRIER,
WM. HIBBARD.